United States Patent
Connell et al.

(10) Patent No.: US 12,329,146 B2
(45) Date of Patent: Jun. 17, 2025

(54) PEST REPELLING DEVICE

(71) Applicant: SCOPAT PROPERTIES, LLC, Highlands Ranch, CO (US)

(72) Inventors: Scott Connell, Jacksonville, FL (US); Raymond Connell, Merewether Heights (AU)

(73) Assignee: Scopat Properties, LLC, Highlands Ranch, CO (US)

( * ) Notice: Subject to any disclaimer, the term of this patent is extended or adjusted under 35 U.S.C. 154(b) by 155 days.

(21) Appl. No.: 18/306,879

(22) Filed: Apr. 25, 2023

(65) Prior Publication Data

US 2023/0404059 A1 Dec. 21, 2023

Related U.S. Application Data

(63) Continuation of application No. 17/161,196, filed on Jan. 28, 2021, now Pat. No. 11,666,046, which is a continuation of application No. 16/736,575, filed on Jan. 7, 2020, now Pat. No. 10,935,267, which is a continuation of application No. 16/128,222, filed on Sep. 11, 2018, now Pat. No. 10,563,881, which is a
(Continued)

(51) Int. Cl.
| | |
|---|---|
| *A01M 29/24* | (2011.01) |
| *F24F 11/30* | (2018.01) |
| *G05B 15/02* | (2006.01) |
| *G05D 23/19* | (2006.01) |
| *F24F 110/10* | (2018.01) |
| *F24F 110/40* | (2018.01) |

(52) U.S. Cl.
CPC .............. *A01M 29/24* (2013.01); *F24F 11/30* (2018.01); *G05B 15/02* (2013.01); *G05D 23/1927* (2013.01); *F24F 2110/10* (2018.01); *F24F 2110/40* (2018.01)

(58) Field of Classification Search
None
See application file for complete search history.

(56) References Cited

U.S. PATENT DOCUMENTS

| | | | |
|---|---|---|---|
| 4,097,838 | A | 6/1978 | Fiala |
| 4,178,578 | A | 12/1979 | Hall |
| 4,215,429 | A | 7/1980 | Riach |
| (Continued) | | | |

FOREIGN PATENT DOCUMENTS

| | | |
|---|---|---|
| AU | 664508 B2 | 11/1995 |
| AU | 2010306413 A1 | 9/2012 |
| (Continued) | | |

*Primary Examiner* — Anthony Ho
(74) *Attorney, Agent, or Firm* — Thompson Patent Law

(57) ABSTRACT

Apparatus and associated methods relate to a pest repelling magnetic field generating device (PRD) having a temperature sensor to detect the temperature of a solenoid coil during operation. The detected temperature to be used to ensure that the PRD operates within an ideal temperature range. Additionally, a fan is oriented within a housing of the PRD to force the flow of air from inside a housing of the PRD to outside a housing the PRD. In an illustrative example, the PRD may shut off if the temperature of the solenoid coil moves outside the ideal temperature range. By operating the PRD within an ideal temperature range, the service life of the PRD may be extended. Further, the fan may mitigate dust collection within the housing of the pest repelling magnetic field generating device.

17 Claims, 10 Drawing Sheets

Related U.S. Application Data continuation of application No. 15/011,162, filed on Jan. 29, 2016, now Pat. No. 10,077,916.

(60) Provisional application No. 63/477,138, filed on Dec. 23, 2022, provisional application No. 63/370,616, filed on Aug. 5, 2022, provisional application No. 63/364,301, filed on May 6, 2022.

(56) References Cited

U.S. PATENT DOCUMENTS

| | | |
|---|---|---|
| 4,338,593 A | 7/1982 | Mills |
| 4,414,653 A | 11/1983 | Pettinger |
| 4,802,057 A | 1/1989 | Patterson et al. |
| 4,870,779 A | 10/1989 | Johnson et al. |
| 5,473,836 A | 12/1995 | Liu |
| 5,930,946 A | 8/1999 | Mah |
| 6,111,514 A | 8/2000 | Cossins et al. |
| 6,208,100 B1 | 3/2001 | Griesemer et al. |
| 6,249,417 B1 | 6/2001 | Pippen |
| 6,400,995 B1 | 6/2002 | Patterson et al. |
| 10,077,916 B2 | 9/2018 | Connell et al. |
| 10,563,881 B2 | 2/2020 | Connell |
| 2012/0263021 A1 | 10/2012 | Connell |
| 2017/0281822 A1 | 10/2017 | Becker et al. |

FOREIGN PATENT DOCUMENTS

| | | |
|---|---|---|
| AU | 2015200650 A1 | 8/2016 |
| WO | 2011044635 A1 | 4/2011 |

PEST REPELLING DEVICE

CROSS-REFERENCE TO RELATED APPLICATIONS

This application claims the benefit of U.S. Provisional Patent Application Ser. No. 63/364,301 titled "Reconfigurable Pest Repellant Field Generator," filed by Scott Joseph Connell on May 6, 2022.

This application claims the benefit of U.S. Provisional Patent Application Ser. No. 63/370,616 titled "Pest Control Cameras and System With Night Vision," filed by Scott Connell on Aug. 5, 2022.

This application claims the benefit of U.S. Provisional Patent Application Ser. No. 63/477,138 titled "Remotely Operated Pest Control Systems," filed by Scott Connell on Dec. 23, 2022.

This application is a Continuation-in-part and claims the benefit of U.S. patent application Ser. No. 17/161,196 titled "Pest Repelling Device," filed by Raymond Connell on Jan. 28, 2021, which is a Continuation and claims the benefit of U.S. patent application Ser. No. 16/736,575 titled "Pest Repelling Device," filed by Raymond Connell on Jan. 7, 2020, which is a Continuation and claims the benefit of U.S. patent application Ser. No. 16/128,222 titled "Pest Repelling Device," filed by Raymond Connell on Sep. 11, 2018, which is a Continuation and claims the benefit of U.S. patent application Ser. No. 15/011,162 titled "Pest Repelling Device," filed by Raymond Connell on Jan. 29, 2016.

This application also contains subject matter related to U.S. patent application Ser. No. 13/502,034 titled "Pest Repellent System and Device," filed by Ray Connell on Jul. 2, 2012, and Australian Patent Application Serial No. 2015200650 titled "Improved Pest Repellent System and Device," filed by Ray Connell on Feb. 10, 2015.

This application incorporates the entire contents of the foregoing application(s) herein by reference.

TECHNICAL FIELD

Various embodiments relate generally to electro-magnetic devices for repelling pests.

SUMMARY

Apparatus and associated methods relate to a pest repelling magnetic field generating device (PRD) having a temperature sensor to detect the temperature of a solenoid coil during operation. The detected temperature to be used to ensure that the PRD operates within an ideal temperature range. Additionally, a fan is oriented within a housing of the PRD to force the flow of air from inside a housing of the PRD to outside a housing the PRD. In an illustrative example, the PRD may shut off if the temperature of the solenoid coil moves outside the ideal temperature range. By operating the PRD within an ideal temperature range, the service life of the PRD may be extended. Further, the fan may mitigate dust collection within the housing of the pest repelling magnetic field generating device.

Various embodiments may achieve one or more advantages. For example, some embodiments may include multiple temperature sensors to detect more accurate information concerning the temperature of the PRD. Various examples include a processor to operate the PRD according to different parameters, for example, time period parameters vs temperature parameters. In an another example, a user may control multiple PRD's via networked device, such as, for example, a mobile device.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
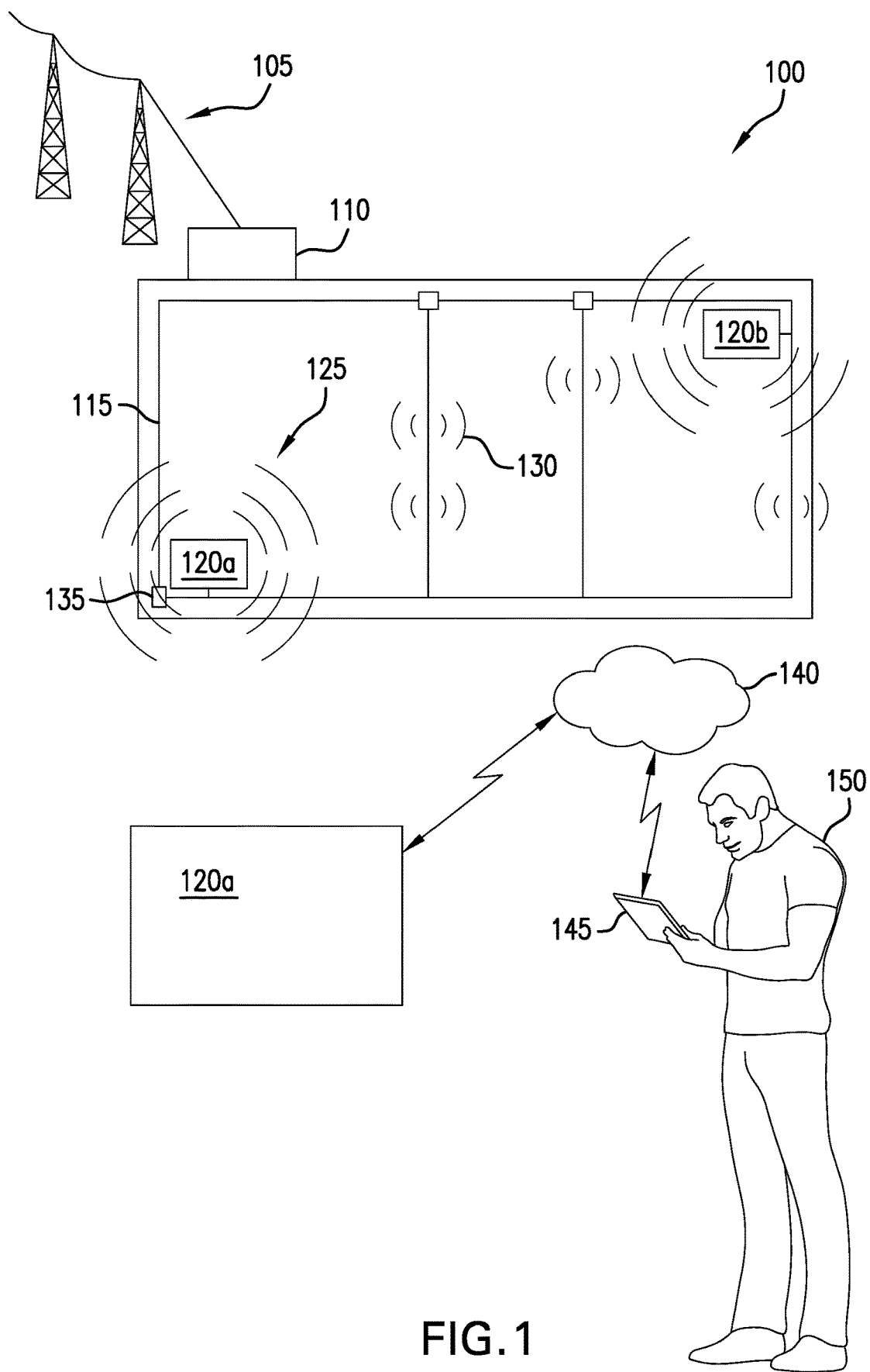
FIG. 1 is a schematic view of an exemplary multiple pest repellent devices (PRD) in operation in a pre-wired facility, and a user controlling the PRD's via a mobile device.

FIG. 1 is a schematic view of an exemplary multiple pest repellent devices (PRD) in operation in a pre-wired facility, and a user controlling the PRD's via a mobile device. An AC power line 105 connects to an external power connector 110 of a facility 100. Wires 115 are located throughout the facility 100 and connect to the external power connector 110 to distribute power throughout the facility 100. The wires 115 having power outlets 135 located throughout the facility. As depicted, each PRD 120a, 120b connects to different power outlets 135. Each PRD 120a, 120b includes a coil (described in further detail in FIGS. 2A-2C), a temperature sensor (described in further detail in FIGS. 3A-3B), a fan (described in further detail in FIGS. 2A-2C), and a processor to operate the PRD (described in further detail in FIG. 5). The temperature sensor detects the temperature information of the coil and transmits the temperature information to the processor. The processor uses the transmitted temperature information to determine whether or not to permit current flow through the coil. By only permitting current to flow through the coil at ideal operating temperatures of the coil, the service life of the PRD 120a, 120b is extended. As such, the fan also extends the service life of the PRD 120a, 120b by causing air to flow from an inside of the PRD 120a, 120b to an outside of the PRD 120a, 120b. The direction of the air flow mitigates dust build-up in the PRD 120a, 120b.

When in operation, each PRD 120a, 120b modulates a magnetic field 125 that radiates in all directions from the PRD's 120a, 120b. The wires 115 further serve as a path for the PRD's 120a, 120b to transmit, along the wires, the magnetic field 130. In various embodiments, the PRD 120a, 120b may advantageously modulate the magnetic field 125 in a manner effective to repel pests from the facility 100.

As depicted, a user 150 operates a mobile device 145. The mobile device 145 is in two-way communication with a network 140. The network 140 is further in two-way communication with the PRD 120a located in the facility 100. In an exemplary embodiment, the user 150 may receive status information about the operation of the PRD's 120. In response to the received status information, the user 150 may send operation instructions to the PRD's 120a.

In some embodiments, the user 150 may send operation instructions that include individual shutoff commands for each PRD 120a, 120b. For example, in a situation where the user 150 may be away from the facility 100 for an extended period of time, the user 150 may receive status information for one PRD 120a showing the temperature of the coil above a predetermined ideal operating temperature. The user may receive status information for the other PRD 120b showing the temperature of the coil within a predetermined ideal operating temperature. In response to the received signals, the user 150 may issue a shutdown command for the PRD 120a while continuing operation of the PRD 120b. In some embodiments, the status information about the PRD 120a, 120b may include other information besides temperature of the coil, for example, time in operation for the PRD 120a, 120b.

Figure 2A:
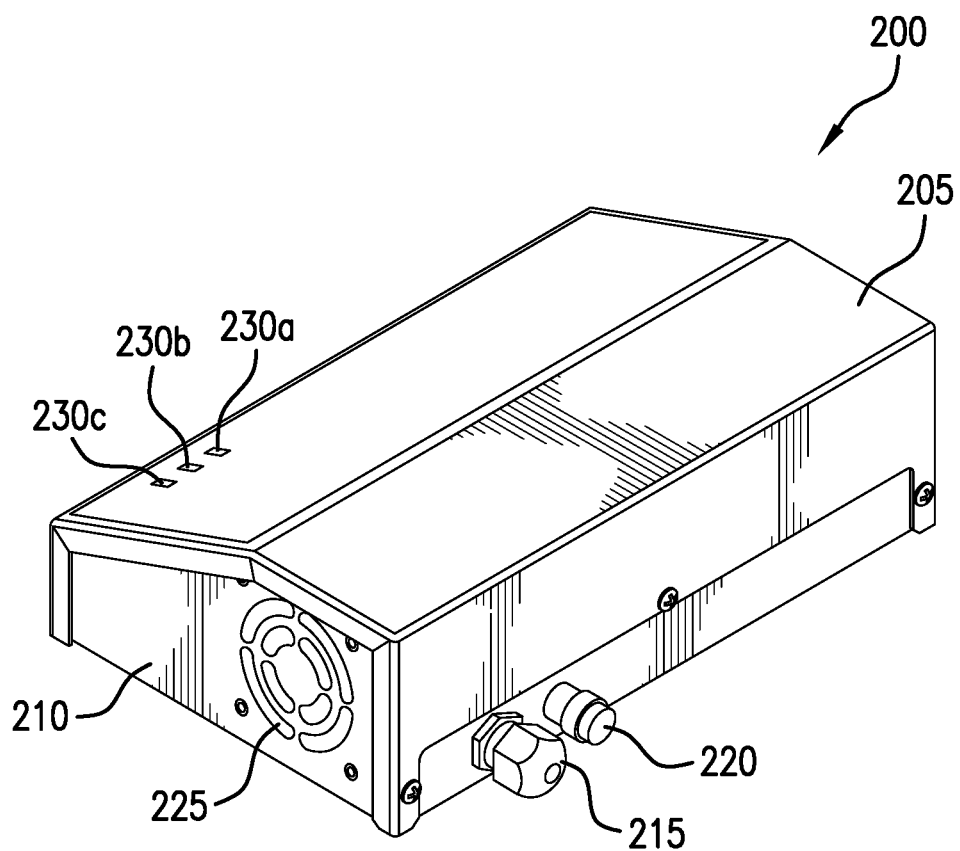
FIG. 2A is a perspective view of the outside of a housing of an exemplary PRD.

FIG. 2A is a perspective view of the outside of a housing of an exemplary PRD. In the depicted figure, the PRD housing 200 is rectangular in shape having a profile similar to that of a right trapezoid. The housing 200 may be constructed of sheet metal. As such, two opposing parallel walls of the housing have different heights, one wall having a greater height and the opposing wall having a lesser height. The housing 200 includes an upper portion 205 and a lower portion 210. The upper portion 205 includes three apertures 230a-230c. As depicted, the apertures 230a-230c are located on the upper portion 205 near the wall of lesser height. The three apertures 230a-230b may each receive a light indicator to indicate the status of the PRD 120a, 120b. For example, the aperture 230b may receive a light indicator to indicate the power status of the PRD 120. If the PRD 120 is receiving power, the light indicator at aperture 230b may light on. The aperture 230a and 230c may receive light indicators to display the operation state of the PRD 120a, 120b. For example, a light indicator at aperture 230a may activate to indicate that the PRD 120a, 120b is a standby mode. A light indicator at aperture 230c may activate to indicate that the PRD 120a, 120b is in an oscillation mode. In some embodiments, the light indicators at apertures 230a-230c may activate individually or in conjunction to indicate different operating states.

The lower portion 210 includes, on a side wall between the parallel walls, a group of apertures 225 arranged to form a circular pattern. The lower portion 210, along the wall of greater height, has two apertures. The first aperture receives a power connector 215. The second aperture receives a fuse 220 such that the fuse 220 is accessible from the outside of the housing 200. In some embodiments, the fuse 220 may be located at different locations of the housing 200 for increased accessibility to the fuse 220 in relation to the placement of the PRD. In some embodiments, the housing 200 may be composed of sheet metal. In other embodiments, the housing 200 may be composed of a plastic material.

Figure 2B:
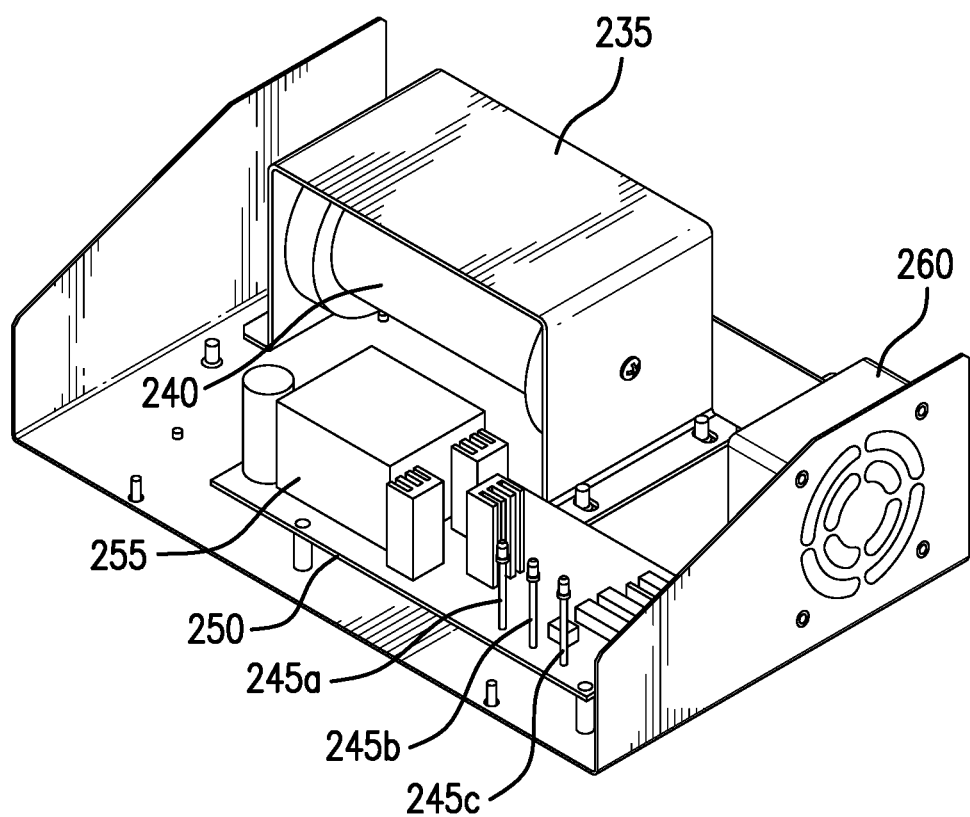
FIG. 2B is a perspective view of the inside of a housing of an exemplary PRD.

FIG. 2B is a perspective view of the inside of a housing of an exemplary PRD. As depicted, a construction of the PRD 120a, 120b is illustrated without the upper portion 205 of the housing 200. A three-sided U-shaped coil support frame 235 includes two parallel side walls, and a singular wall connecting the two parallel side walls. The U-shaped coil support frame 235 may be constructed of sheet metal. The U-shaped coil support frame 235 attaches, at the open end of the parallel walls to the lower portion 210 of the housing 200. A solenoid coil 240 attaches to the parallel side walls of the U-shaped coil support frame 235. In some embodiments, multiple solenoid coils may be attached inside the U-shaped coil support frame. A spring may be placed between the multiple coils to prevent the multiple coils from touching.

A circuit board 250 attaches to lower portion 210 of the housing 200. The circuit board 250 includes a circuit for operating the PRD 120a, 120b including a processor 255 to receive information and generate operation commands. Three indicator lights 245a-245c for indicating status information about the operation state of the PRD 120a, 120b attach to the circuit board 250. In some embodiments, the number of indicator lights 245a-245c may be increased or decreased.

A fan 260 attaches to a side wall of the lower portion 210 in alignment with the group of apertures 225. In various embodiments, multiple groups of apertures may be distributed around the housing 200 to align with multiple fans.

Figure 2C:
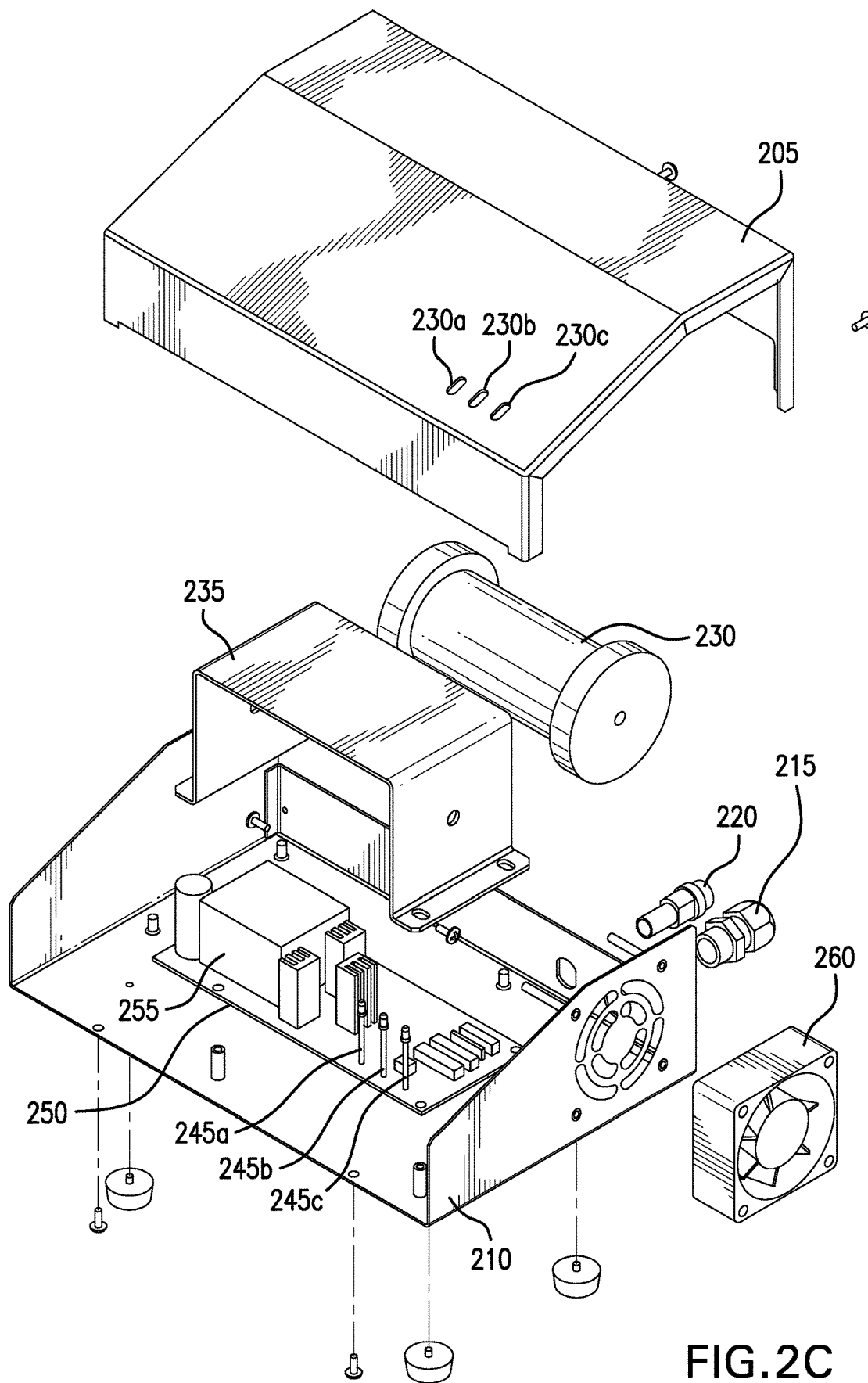
FIG. 2C is a a perspective view of the components of an exemplary PRD.

FIG. 2C is a perspective view of the components of an exemplary PRD. As depicted, the upper portion 205 of the housing 200 is located above the lower portion 210. The upper portion 205 includes the apertures 230a-230c aligned to receive the indicator lights 245a-245c. The indicator lights 245a-245c attach to the circuit board 250. The circuit board 250 is between the upper portion 205 and the lower portion 210. The U-shaped coil support frame 235 above the lower portion 210 and below the upper portion with the solenoid coil 240 to a side of the U-shaped coil support frame. As depicted, the fuse 220 and the power connector 215 are behind and beside the lower portion 210. Below the lower portion 210, four rest pedestals are depicted. The pedestals may raise up the housing 200 to provide an air space thereunder. In some embodiments, intake apertures may be formed in a bottom the housing 200. The intake apertures may advantageously provide an air flow intake path for air to be drawn to cool the PRD components, such as the solenoid coil 240, in response to the action of the exhaust fan 260. The intake apertures may be provided, in some examples, along the seams of the housing 200 where the top meets the base portions of the housing 200, for example. Filter screens may be used to substantially mitigate the ingress of dust, for example.

Figure 3A:
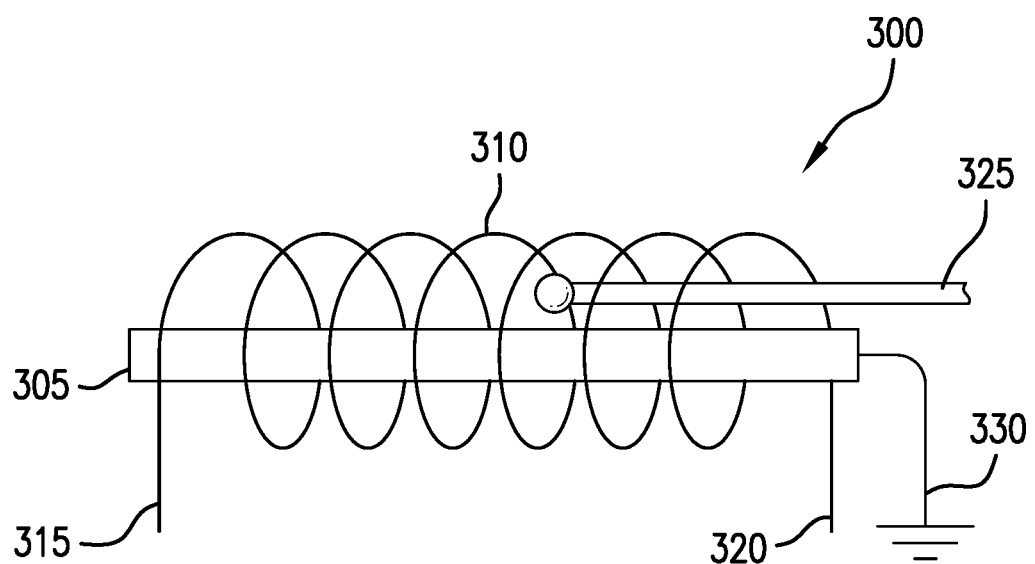
FIG. 3A is a cross-section view of an exemplary solenoid coil with a singular temperature sensor.

FIG. 3A is a cross-section view of an exemplary solenoid coil with a singular temperature sensor. The solenoid coil 300 includes an axle 305. The axle 305 runs through the center of the wiring 310 of solenoid coil 300. As depicted, the axle 305 connects to ground 330. The wiring 310 of the solenoid coil 300 includes two terminal connections 315 320. The two terminals 315 320 may connect the solenoid coil to other electrical components. For example, the terminal connector 315 may connect to a power source and the terminal connector 320 may connect to an activation switch. In some embodiments, the activation switch may be a triac. A temperature sensor 325 is located in the longitudinal center of the solenoid coil 300.

Figure 3B:
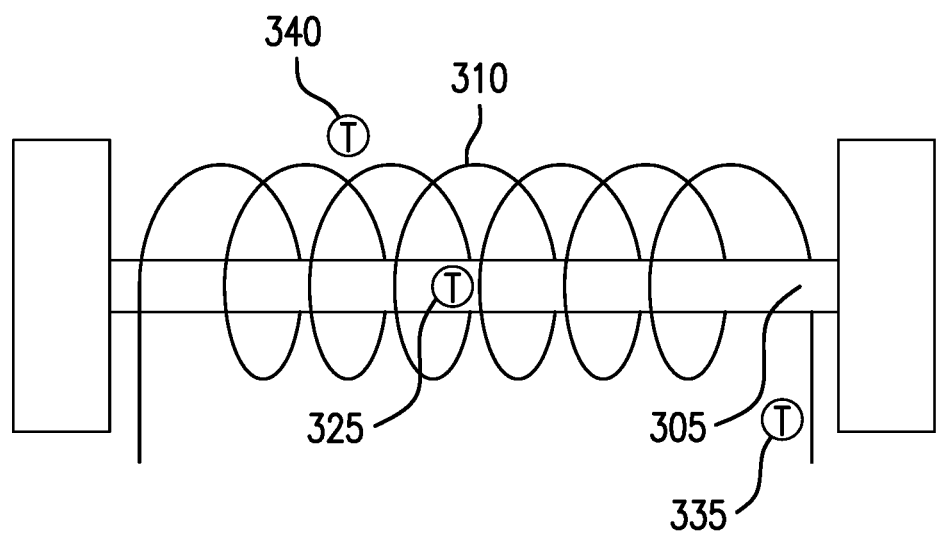
FIG. 3B is a cross-section view of an exemplary solenoid coil with multiple temperature sensors.

FIG. 3B is a cross-section view of an exemplary solenoid coil with multiple temperature sensors. As depicted, the axle 305 runs through the center of the wiring 310 of the solenoid coil 300. The temperature sensor 325 remains located in the longitudinal center of the solenoid coil 300. A second temperature sensor 340 is located above a left side of the solenoid coil 300. A third temperature sensor 335 is located below a right side of the solenoid coil 300. Each of the temperature sensors 325, 335, 340 may transmit temperature information about the solenoid coil 300 relative to the location of each temperature sensor 325, 335, 340. As such, more accurate temperature information concerning the temperature of the solenoid coil may be collected to improve the operation efficiency of the PRD 120.

In some embodiments, a combination of the temperature sensors 325, 335, 340 may be used. For example, the temperature sensor 325 may be used in conjunction with the second temperature sensor 340, or the second temperature sensor 340 and third temperature sensor 335 may be used in conjunction and without the temperature sensor 325.

Figure 4:
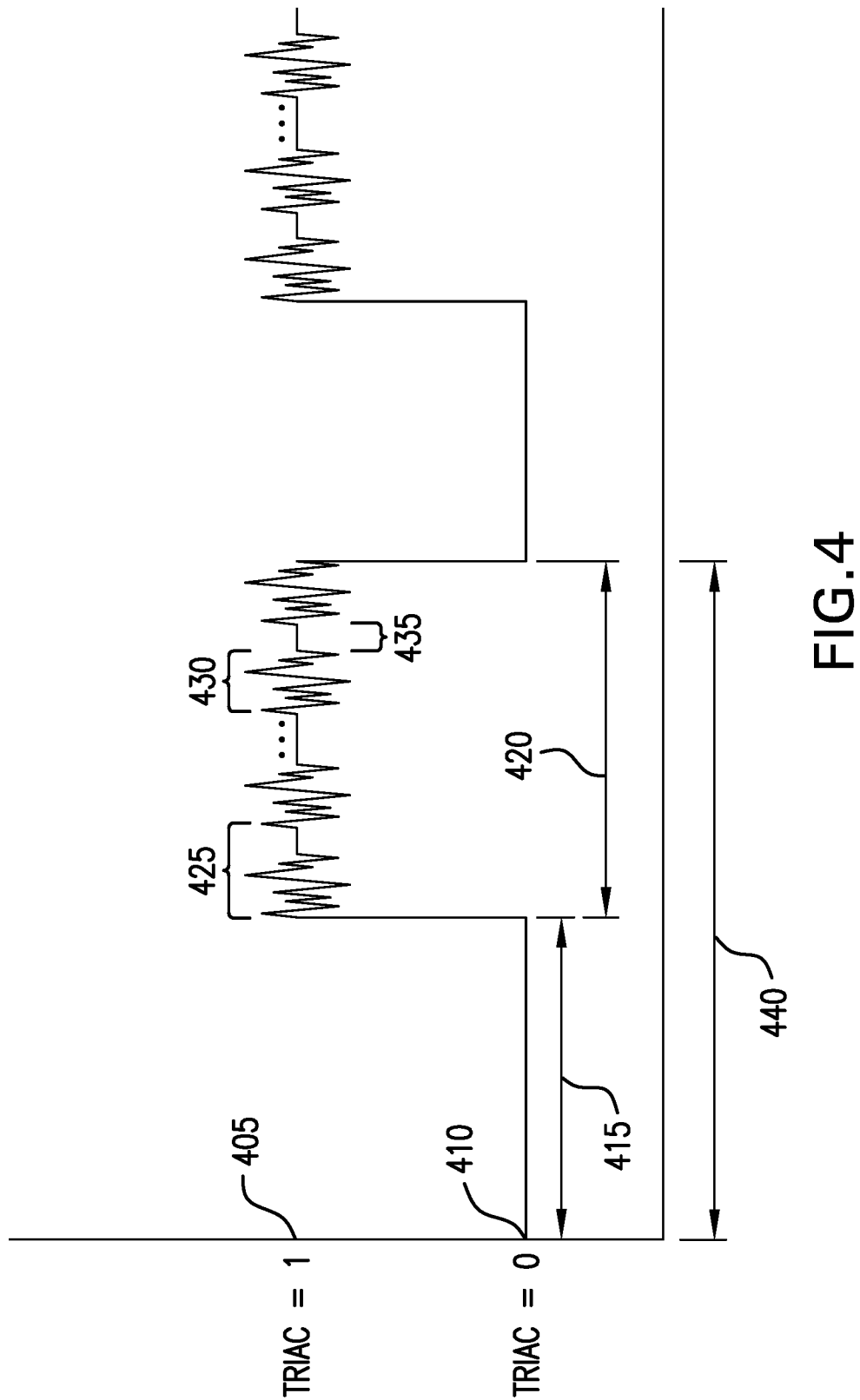
FIG. 4 is a graph of periods of operation for an exemplary PRD.

FIG. 4 is a graph of periods of operation for an exemplary PRD. As depicted, the vertical axis represents the values for a triac that controls the current flow through the solenoid coil 300. The triac has a deactivation period 415 when the triac has a value of zero 410. The triac has an activation period 420 when the triac has a value of one 405. A periodic cycle 440 includes a deactivation period 415 and an activation period 420. The periodic cycle 440 may have a length of 4.8 seconds. The deactivation period 415 and the activation period 420 may be of equal length, for example, both the deactivation period and the activation periods may have a length of 2.4 seconds. During the deactivation period 415, the triac prevents current from flowing through the solenoid coil 300.

During the activation period 420, the triac permits current to flow through the solenoid coil in burst cycles 425. The burst cycles 425 are smaller periods within the activation period 420. Each burst cycle 425 includes a current flow period 430 and a current no-flow period 435. During the current flow period 430, the triac permits current to flow through the solenoid coil 300. During the current no-flow period 435, the triac does not permit current to flow through the solenoid coil 300. The current flow period 430 and the current no-flow period 435 may be equal in length. These burst cycles 425 create a pulsating effect during the activation period 420. The activation period 420 may include many burst cycles 425, for example, 225 burst cycles may be included in one activation period.

In some embodiments, the deactivation period 415 and the activation period 420 may be of different lengths. In other embodiments, the current flow period 430 and the current no-flow period 435 may be equal in length.

In some embodiments, the deactivation period 415 and the activation period 420 may not be dependent on the length of time, for example, the deactivation period 415 and activation period 420 may be dependent on the temperature of the solenoid coil 300. A predetermined threshold for a high temperature for the solenoid 300 may be set, such that, when the temperature of the solenoid coil 300 exceeds the predetermined high-temperature threshold, the PRD 300 may enter the deactivation period 415. A predetermined threshold for a low temperature for the solenoid coil 300 may be set, such that, when the temperature of the solenoid coil 300 exceeds the predetermined low temperature, the PRD 300 may enter the activation period. The activation period may last as long as the temperature of the solenoid coil 300 does not exceed predetermined high temperature.

Figure 5:
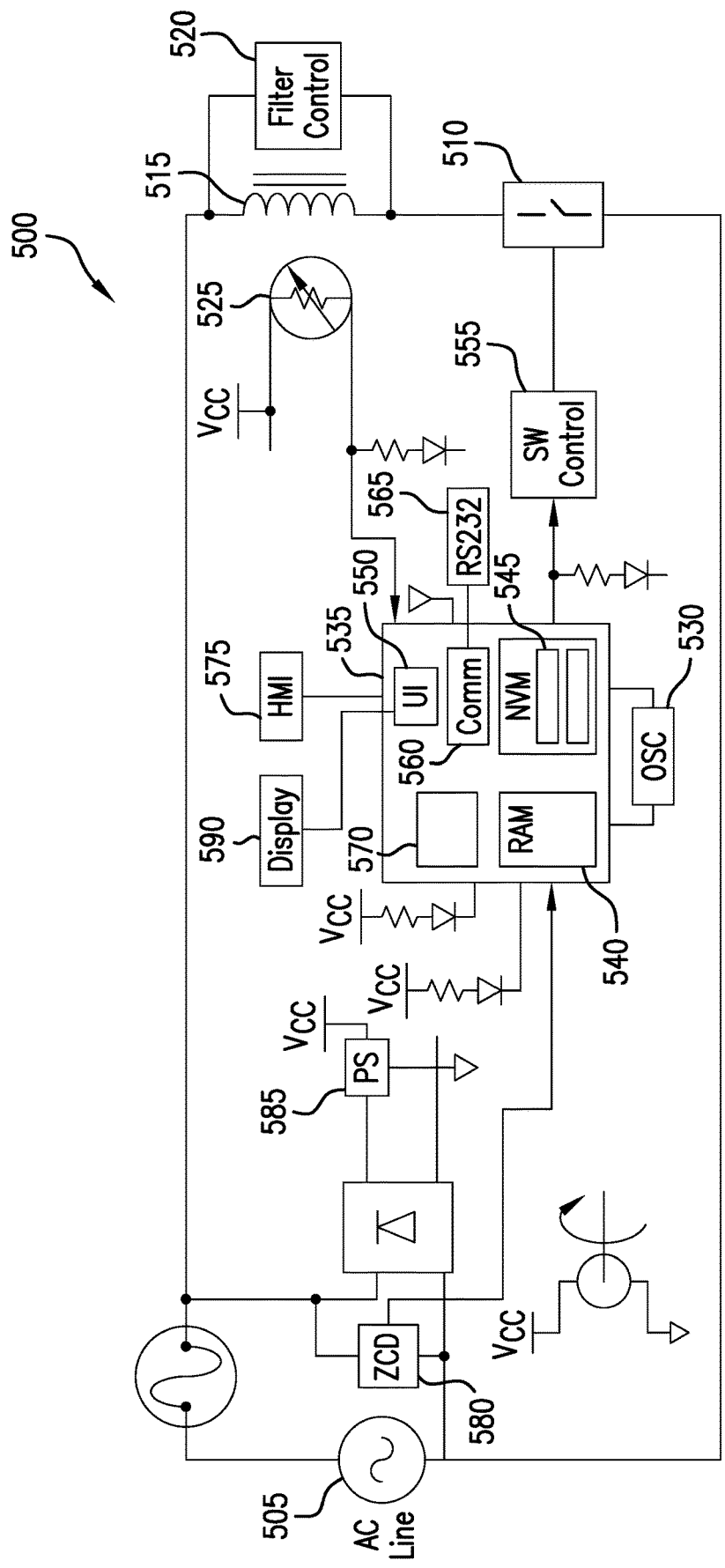
FIG. 5 is a schematic diagram of an exemplary embodiment of a PRD circuit.

FIG. 5 is a schematic diagram of an exemplary embodiment of a PRD circuit. A semiconductor switching device 510 connects in series to an iron core coil 515 between a hot and neutral line of the AC line 505. The iron core coil 515 is disposed within a filter control 520. A temperature sensor 525 detects temperature information for the iron core coil 515 and transmits the detected temperature information to a central processing unit (CPU) 535. The CPU 535 has a random access memory module (RAM) 540, a non-volatile memory module (NVM) 545, a user interface module (UI) 550, a communications port module (Comm) 560, and a processor 570.

Figure 6:
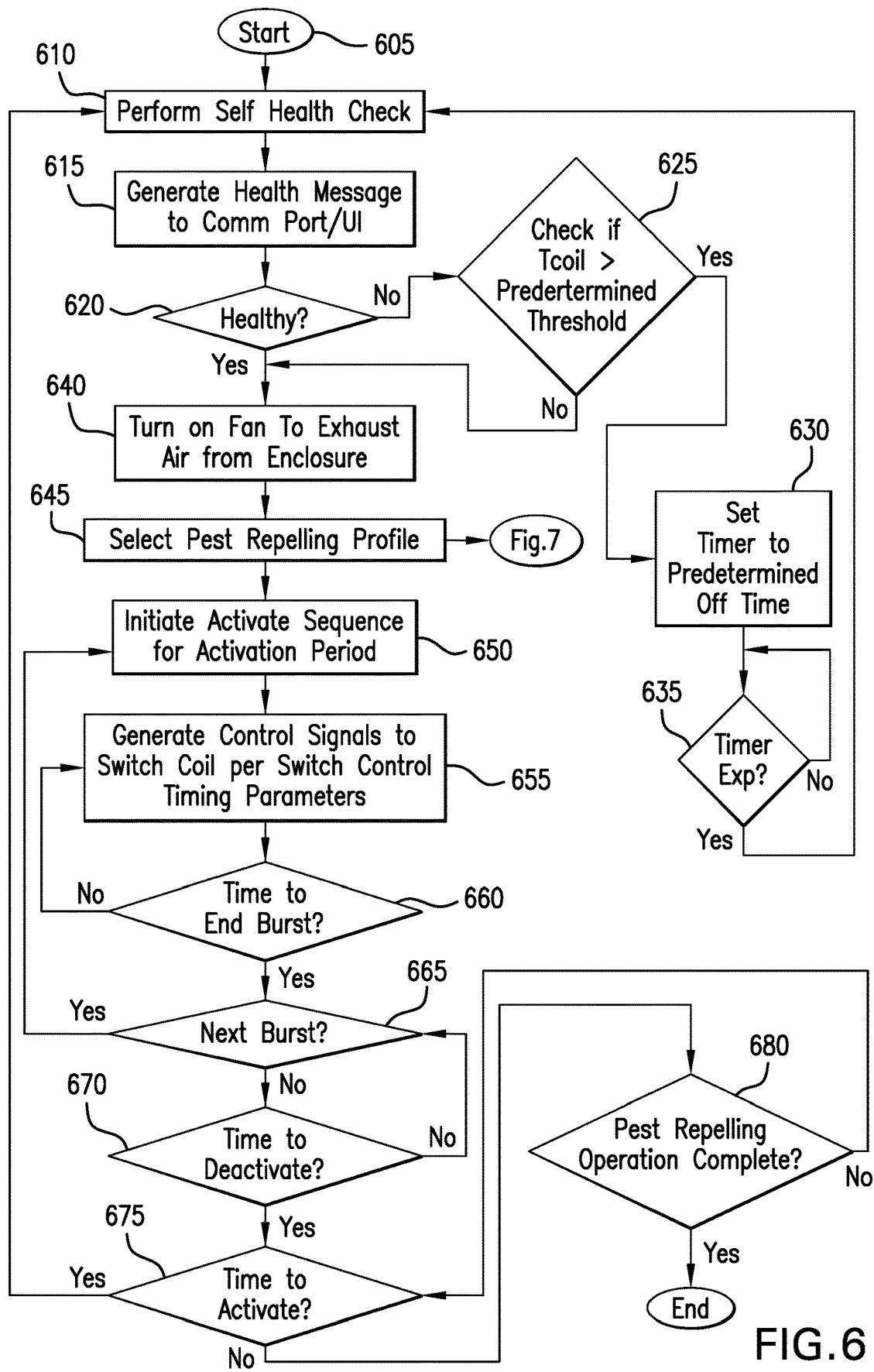
FIG. 6 is a flow chart diagram of an exemplary pest repelling operation.

The CPU 535, in response to receiving the detected temperature information, triggers the processor 570 execute a pest repelling operation (described in further detail in FIG. 6). The pest repelling operation involves the processor 570 executing a health check of the PRD by comparing the detected temperature information against a predetermined ideal operation temperature range contained in the NVM 545. For example, if the detected temperature exceeds the predetermined ideal range, the processor 570 may communicate with the NVM 545 to generate a shutdown command to a switch controller 555. The switch controller 555 executes the shutdown command by deactivating the semiconductor switching device to prevent current from flowing through the iron core coil 515 effecting a current blocking state. In another example, if the detected temperature does exceed the predetermined ideal range, the processor 570 may generate a turn-on command to a switch controller 555 for activating the semiconductor switching device 510 to modulate a conductivity through the iron core coil 515 effecting a current flow state.

The CPU 535 may receive user input data from a serial port (RS232) connect to the Comm 560 or from a human machine interface (HMI) 575. The processor 570 may execute the user input data to select a burst profile (described in further detail in FIG. 7) according to the user input data. For example, if the user input data calls for a modification to a burst cycle 425 during the activation period 420, the processor may communicate with the NVM 545 to generate a burst profile to the switch controller 555. The switch controller 555 will activate and deactivate the semiconductor switching device 510 between current blocking states and current flow states according to the burst profile.

A display 590 is connected to the UI 550 for displaying information about the operation of the PRD to a user.

A zero cross detector 580 connects to the hot and neutral lines of the AC line 505 to operate in conjunction with a phase shifter (PS) 585 to generate a phase shift control signal to the CPU 535. Upon receiving the phase shift control signal, the processor 570 may use the phase shift control signal to generate a burst profile, in accordance with the phase shift control signal, to the switch controller 555.

FIG. 6 is a flow chart diagram of an exemplary pest repelling operation. At step 610, the processor performs a self-healthcare check to generate a health message, at step 615, to a communications port. At 620, if the health message is negative, the processor, at step 625, checks to see if the temperature of the coil exceeds a predetermined threshold. If the temperature does exceed a predetermined threshold, the processor, at step 630, sets a timer to turn off the PRD. At step 635, an expiration check is conducted to determine if the timer has expired. If the timer has not expired, the expiration check will repeat itself until the timer is expired. Once the expiration check determines the timer has expired, the processor will perform a self-health check at step 610.

If, at step 625, the temperature of the coil does not exceed the predetermined threshold, then, at step 640, the fan turns on to exhaust air from the housing of the PRD. At step 645, the processor receives a burst profile for the operation of the PRD (described in further detail in FIG. 7). Using the burst profile, at step 650, an activate sequence is initiated for an activation period generating control signals, at step 655, in accordance with per switch control timing parameters, to begin the burst by activating the switch to permit current to flow through a solenoid coil. At step 660, the processor determines, according to the burst profile from step 645, if it is time to end the burst by deactivating the switch. If it is not time end the burst, the processor will further generate control signals, at step 655. If it is time to end the burst, at step 665, the processor will determine whether or not to begin a next burst. In the event of a next burst, the processor repeats steps 650-665. If no next burst is called for at step 665, the processor will decide if it is time to deactivate the PRD. In the event it is not time to deactivate the PRD, step 665 repeats. In the event it is time to activate the PRD, the processor, at step 675, will determine if it is time to activate the PRD. If it is time to activate the PRD, the processor will begin the process again, at step 610. If it is not time to activate the PRD, the processor will determine, according to the burst profile received at step 645, whether or not the pest repelling operation is complete. If the pest repelling operation is not complete, step 675 repeats. If the pest repelling operation is complete, the operation ends.

Figure 7:
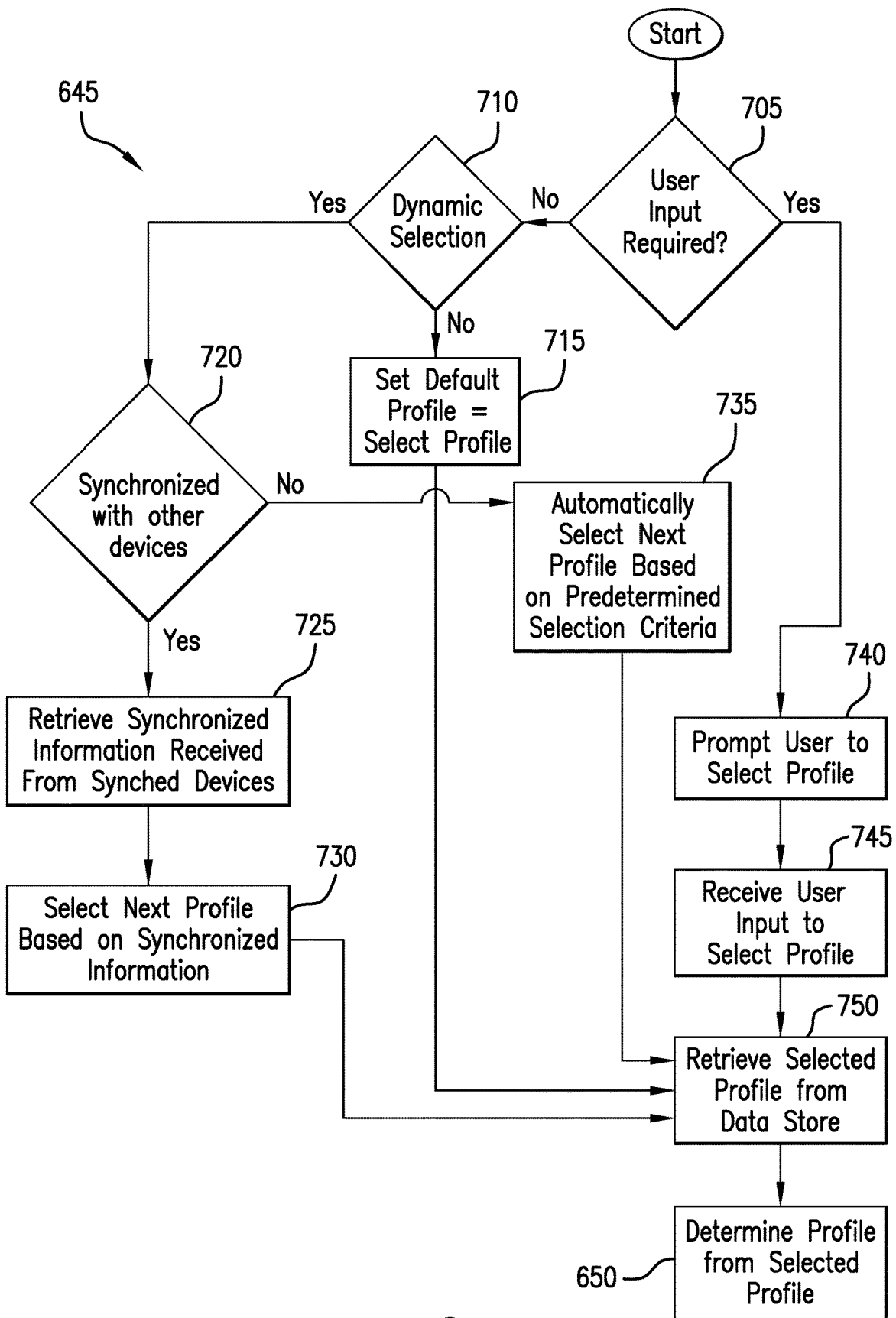
FIG. 7 is a flow chart diagram of an exemplary profile selection subroutine.

FIG. 7 is a flow chart diagram of an exemplary profile selection subroutine. FIG. 7 depicts the subroutine for step 645. At step 705, the processor determines whether user input will be required. A negative response at step 705 will cause the processor to determine if a dynamic selection will be used. If a dynamic selection is required, whether or not the PRD needs to be synchronized with other PRD's is determined, at step 720. In the event that the PRD needs to be synchronized with other PRD's, at step 725, synchronized information is retrieved from synched PRD's. At step 730, a next profile is selected according to the information received from step 725. The next profile will then be retrieved, at step 750, from a data store. The next profile is then transmitted to step 650.

In the event that the PRD does not need to synchronize with other PRD devices, at step 720, a next profile will be automatically selected based on predetermined selection criteria, at step 735. The selected next profile will then be retrieved, at step 750, from a data store. The next profile is then transmitted to step 650.

In the event that no dynamic selection is required, at step 710, a next profile will be set to a default profile, at step 715. The next profile will then be retrieved, at step 750, from a data store. The next profile is then transmitted to step 650.

If, at step 705, it is determined that user input is required, a user will be prompted to select a profile, at step 740. The user input will be received, at step 745, to select the next profile. The next profile will then be retrieved, at step 750, from a data store. The next profile is then transmitted to step 650.

Although various embodiments have been described with reference to the Figures, other embodiments are possible. For example, the communications port 560 may include wireless network module to enable communication between a PRD and a mobile wireless device. The wireless communication may be peer-to-peer or via a wide area network. In other embodiments, a user may input operation commands via a mechanical user input located on the device.

In some embodiments, AC phase control may be employed by the processor as a method of operating the solenoid coil by not firing the triac until the AC line voltage reaches a desired phase angle. By delaying trigger signal to the triac, the processor can effectively control the current waveform amplitude, and thereby the strength of the generated magnetic field weakens. This may advantageously be used to manage the temperature of the solenoid coil, for example, on days when the ambient temperature is high. By reducing the amplitude of the current, less heat will be generated by the current, and the pest repellent operation may be maintained at a reduced magnetic field in the event of high ambient temperature.

In other embodiments, the switch may be a bidirectional switch. The processor may be a single core processor or multi-core processor. Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In other embodiments, a centralized database may contain identification information, for example, serial numbers, about each PRD distributed throughout a facility. The PRD's may transmit operation information, for example, the temperature of a solenoid coil to be saved in the centralized database. A centralized location, for example, a company offering monitoring services, may access the database to monitor operation information for individual PRD's to ensure proper functioning of an individual PRD. For example, the company may be alerted when an individual PRD operation nears a predetermined high threshold temperature. As such, the company may proactively monitor the individual PRD to ensure that the individual PRD shuts down if the predetermined high threshold temperature is exceeded. In the event the PRD does not shut down if the high threshold temperature is exceeded, the company may respond more quickly to addressing the issue. In some embodiments, the centralized database may collect information from PRD's across multiple facilities.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A pest control system, comprising:
   a plurality of pest monitoring devices, each comprising a pest repelling magnetic field generating device, a pest detection device, and a pest trapping device, wherein the pest repelling magnetic field generating device comprises a fan oriented to force air to flow through at least 10 one aperture of the pest magnetic field generating device from an inside of the pest magnetic field generating device to the outside of the pest magnetic field generating device; and, a computer system operably coupled to the plurality of pest monitoring devices and configured to remotely control the plurality of pest monitoring devices, the computer system comprising:
    a processor; and,
    a tangible memory storage device containing a program of instructions that, when executed by the processor, cause the processor to perform operations to remotely control one or more remotely connected pest monitoring device based on user status information and a pest activity profile, the operations comprising:
        receive a remote communication signal from the plurality of pest monitoring devices;
        retrieve an account standing associated with the plurality of pest monitoring devices;
        if the account standing does not meet a predetermined criterion for operating the plurality of pest monitoring devices, then generate control signals to deactivate the plurality of pest monitoring devices; and,
        if the account standing meets a predetermined criterion for operating the plurality of pest monitoring devices, then, based on a machine learning model, generate control signals to configure the plurality of pest monitoring devices, wherein the machine learning model is trained on a statistical model of pest activity, historical configurations of the plurality of pest monitoring devices, and a current configuration of the plurality of pest monitoring devices to generate an updated configuration of the plurality of pest monitoring devices, wherein the statistical model of pest activity is generated by processing raw data received from the pest detection device, such that the pest control system is configured to actively reduce pests.

2. The pest control system of claim 1, wherein the operations further comprising generate and display a recommendations and report display based on the statistical model of pest activity.

3. The pest control system of claim 2, wherein the recommendations and report comprises a heatmap of pest activities.

4. The pest control system of claim 2, wherein the recommendations and report comprises a pest repelling score generated based on a placement configuration of the plurality of pest monitoring devices.

5. The pest control system of claim 1, wherein the detection device comprises a night vision camera.

6. The pest control system of claim 5, wherein the operations further comprising identify a type of pest detected based on data received from the night vision camera.

7. The pest control system of claim 1, wherein the pest trapping device comprises a smart trap door, wherein the control signals comprise activating the sliding door to capture a target pest.

8. A computer system configured to remotely control a plurality of pest monitoring devices, the computer system comprising:
    a processor; and,
    a tangible memory storage device containing a program of instructions that, when executed by the processor, cause the processor to perform operations to remotely control one or more remotely connected pest monitoring device based on user status information and a pest activity profile, the operations comprising:
        receive a remote communication signal from the plurality of pest monitoring devices;
        retrieve an account standing associated with the plurality of pest monitoring devices;
        if the account standing does not meet a predetermined criterion for operating the plurality of pest monitoring devices, then generate control signals to deactivate the plurality of pest monitoring devices; and, if the account standing meets a predetermined criterion for operating the plurality of pest monitoring devices, then, based on a machine learning model, generate control signals to configure the plurality of pest monitoring devices, wherein the machine learning model is trained on a statistical model of pest activity, historical configurations of the plurality of pest monitoring devices, and a current configuration of the plurality of pest monitoring devices to generate an updated configuration of the plurality of pest monitoring devices, such that the pest control system is configured to actively reduce pests.

9. The computer system of claim 8, wherein the plurality of pest monitoring devices comprises a pest repelling magnetic field generating device, wherein the pest repelling magnetic field generating device comprises a fan oriented to force air to flow through at least one aperture of the pest magnetic field generating device from an inside of the pest magnetic field generating device to the outside of the pest magnetic field generating device.

10. The computer system of claim 9, wherein the operations further comprise receive, via a temperature sensor of the pest repelling magnetic field generation device, status information concerning the temperature of a solenoid coil disposed within the pest magnetic field generating device.

11. The computer system of claim 8, wherein the operations further comprising generate and display a recommendations and report display based on the statistical model of pest activity.

12. The computer system of claim 11, wherein the recommendations and report comprises a heatmap of pest activities.

13. The computer system of claim 11, wherein the recommendations and report comprises a pest repelling score generated based on a placement configuration of the plurality of pest monitoring devices.

14. The computer system of claim 8, wherein the plurality of pest monitoring devices comprises a pest detection device, wherein the statistical model of pest activity is generated by processing raw data received from the detection device.

15. The computer system of claim 14, wherein the pest detection device comprises a night vision camera.

16. The computer system of claim 15, wherein the operations further comprising identify a type of pest detected based on data received from the night vision camera.

17. The computer system of claim 8, wherein the pest trapping device comprises a smart trap door, wherein the control signals comprise activating the sliding door to capture a target pest.

\* \* \* \* \*